United States Patent [19]

Yokoyama et al.

[11] Patent Number: 4,563,436

[45] Date of Patent: Jan. 7, 1986

[54] CATALYST COMPONENT FOR α-OLEFIN POLYMERIZATION AND METHOD OF PRODUCING THE SAME

[75] Inventors: Masuzo Yokoyama; Toshihiko Sugano, both of Yokkaichi, Japan

[73] Assignee: Mitsubishi Petrochemical Co., Ltd., Tokyo, Japan

[21] Appl. No.: 681,209

[22] Filed: Dec. 13, 1984

[30] Foreign Application Priority Data

Dec. 19, 1983 [JP] Japan .................. 58-239098

[51] Int. Cl.$^4$ .................................. C08F 4/64
[52] U.S. Cl. .................................. 502/104; 502/126; 502/127; 526/125; 526/142
[58] Field of Search ............ 502/104, 126, 127

[56] References Cited

U.S. PATENT DOCUMENTS

| | | | |
|---|---|---|---|
| 3,882,046 | 5/1975 | Pomogailo et al. | 502/127 X |
| 4,168,358 | 9/1979 | Harada et al. | 502/126 X |
| 4,335,015 | 6/1982 | Imai et al. | 502/127 |
| 4,342,856 | 8/1982 | Patnaik | 502/127 X |
| 4,343,721 | 8/1982 | Goodall et al. | 502/127 X |

*Primary Examiner*—Patrick P. Garvin
*Attorney, Agent, or Firm*—Oblon, Fisher, Spivak, McClelland & Maier

[57] ABSTRACT

A catalyst component for polymerization of α-olefins is produced by causing mutual contact of:

(A) a magnesium halide containing solid;
(B) an electron donating compound, having the structural site as represented by the formula show below in its molecule:

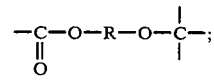

and
(C) a titanium halide. The catalyst thus produced has high polymerization activity and is capable of producing polymers having excellent stereoregularity.

7 Claims, No Drawings

CATALYST COMPONENT FOR α-OLEFIN POLYMERIZATION AND METHOD OF PRODUCING THE SAME

BACKGROUND OF THE INVENTION

1. Technical Field

This invention relates to a titanium-containing solid catalyst component for α-olefin polymerization and a method of producing the same. More particularly, the present invention pertains to the so-called carrier type titanium-containing solid catalyst component, having highly stereoregular polymerizability and activity for production of an α-olefin polymer having stereoregularity. The carrier type titanium containing solid catalyst component can be further used in combination with an organic aluminum compound as a catalyst for polymerization of α-olefins.

2. Prior Art

Concerning titanium-carrying type catalyst systems, it has been known for a long time to add various electron donating compounds to the catalyst system for the purpose of improving the stereoregularity of the polymer (J. Polymer Science, Polymer Letters, 3, 855 (1965)). In particular, a large number of proposals have been made regarding catalyst preparation methods in which electron donating compounds are incorporated in the titanium-carrying type catalyst components. Among electron donating compounds such as esters, amines, ketones and ethers, esters, particularly esters of polycarboxylic acids having specific structures or esters of monocarboxylic acids having alkyl groups of specific structures have been shown to exhibit excellent effects in obtaining stereoregular polymers (Japanese Laid-Open Patent Publication No. 94950/1979, EP-45976, EP-45977, and Japanese Laid-Open Patent Publication No. 145707/1983).

SUMMARY OF THE INVENTION

The present invention has been conceived and developed on the basis of a discovery that, by the use of an electron donating compound having a specific structure, the effect of which is not entirely known in the known techniques, a titanium-containing solid catalyst component for stereoregular polymerization of an α-olefin superior in use to the electron donating compounds mentioned in the above known techniques can be obtained.

Accordingly, the method of producing the titanium-containing solid catalyst component for α-olefin polymerization according to the present invention comprises causing the following components (A), (B) and (C) to contact one another:

(A) a magnesium halide-containing solid;
(B) an electron donating compound, with proviso that this electron donating compound has a structural site as represented by the formula given below in its molecule:

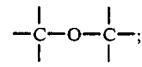

wherein R is a hydrocarbon residue having 1 to 12 carbon atoms or an organic residue having 1 to 12 atoms containing the structural site:

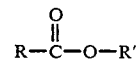

and (C) a titanium halide.

It is well known in the art to use an organic carboxylic acid monoester as an electron donating compound to be introduced into a solid titanium catalyst component. In particular, in the stereoregular polymerization of an α-olefin, when forming a Ziegler type catalyst by combination of an organic aluminum compound, a cocatalyst comprising silicon compound having Si—O—C bonding and a solid titanium catalyst component, it has been known to be effective to use an aromatic carboxylic acid ester (Japanese Laid-Open Patent Publication No. 94950/1979) or

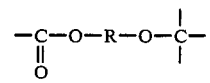

(at least one of R and R' being a hydrocarbyl group having 3 to 20 carbon atoms) (EP-45977) as the organic carboxylic acid monoester contained in the solid titanium catalyst component. However, when the electron donating compound as defined in the present invention, the effect of which has heretofore been absolutely unknown, is incorporated in the titanium containing solid catalyst component, a markedly higher stereoregular α-olefin polymerization than in the case of employing a known organic carboxylic acid monoester having a similar structural site is made possible.

The electron donating compound defined in the present invention is a compound having a structural site as specified by the formula:

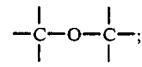

which is apparently a compound having a structure similar to an organic carboxylic acid monoester but is greatly different in effect from the known organic carboxylic acid monoester with a structure of

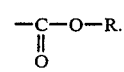

Accordingly, to define in more detail the electron donating compound of the present invention, it can also be represented by a specific feature of having also a bonding:

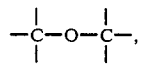

thereby exhibiting an excellent effect specifically different from those of other known organic carboxylic acid monoesters. In this context, compounds only with simple bonding:

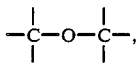

for example, ether compounds, have no such effect as possessed by the electron donating compound of the present invention, as is well known in the art, and this fact will also be clarified in Comparative Examples set forth hereinafter.

As described above, the effect of the present invention is based on the structural specificity of the electron donating compound employed, but the reason why this effect is exhibited has not yet been clarified.

DETAILED DESCRIPTION OF THE INVENTION

Preparation of titanium-containing solid catalyst component:

The titanium-containing solid catalyst component of the present invention is prepared by causing the components (A), (B) and (C) to contact one another.

Component (A)

The component (A) is a magnesium halide-containing solid. As the halogen, fluorine, chlorine, bromine and iodine may be used, chlorine being preferred.

Here, the term "magnesium halide-containing solid" is meant to be inclusive of magnesium halide itself, magnesium halide which has been modified with another electron donating compound other than the component (B), and a solid compound such as the solid product obtained by precipitation from a solution of magnesium halide in a hydrocarbon containing a dissolving agent (e.g., tetrabutyltitanate, ether, phosphate ester) according to a known method (e.g., addition of methylhydrogenpolysiloxane, titanium tetrachloride).

Component (B)

The component (B) is a compound having a structural site represented by the formula given below in its molecule:

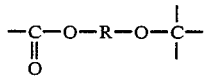

wherein R is a hydrocarbon residue having 1 to 12 carbon atoms or an organic residue having 1 to 12 atoms containing the structural side:

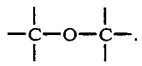

In the above structure, R should preferably be a relatively short chain non-branched hydrocarbon residue having 1 to 4 carbon atoms, and the carbon in

should preferably be a non-branched carbon atom. Further, this compound should have no polar atom such as O, S and N at portions other than the above specific structure. Further, this compound should preferably have one structure of the formula:

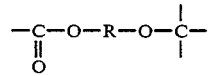

in a molecule.

Of such compounds, preferably ones are represented by the following formula (B'):

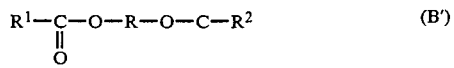

wherein R is the same as R in the above formula, preferably an alkylene group having 1 to 12 carbon atoms, and each of $R^1$ and $R^2$ represents an alkyl, an aryl, an alkyl-substituted aryl or an aryl-substituted alkyl.

Of the compounds represented by the formula (B'), particularly preferable compounds are ethers of ethylene oxide and propylene oxide adducts (one mode) of lower aliphatic monocarboxylic acids (with $R^1$ having about 1 to 12 carbon atoms) and benzoic acid (with $R^1$ being a phenyl), particularly lower $C_1$–$C_{12}$ alkyl or phenyl or tolyl ether.

Typical examples of such electron donating compounds are enumerated below:
2-methoxyethyl-acetate ($CH_3CO_2CH_2CH_2OCH_3$),
2-ethoxyethyl-acetate ($CH_3CO_2CH_2CH_2OC_2H_5$),
2-butoxyethyl-acetate ($CH_3CO_2CH_2CH_2OC_4H_9$),
3-methoxybutyl-acetate ($CH_3CO_2(CH_2)_2CH(OCH_3)CH_3$),
2-(2-ethoxyethoxy)ethyl-acetate ($CH_3CO_2CH_2CH_2OCH_2CH_2OC_2H_5$),
2-p-tolyloxyethyl-acetate ($CH_3CO_2CH_2CH_2OC_6H_4(CH_3)$),
ethoxylmethyl-acetate ($CH_3CO_2CH_2OC_2H_5$),
3-ethoxypropyl-acetate ($CH_3CO_2CH_2CH_2CH_2OC_2H_5$),
4-ethoxybutyl-acetate ($CH_3CO_2CH_2CH_2CH_2CH_2OC_2H_5$),
n-butylcarbitol-acetate ($CH_3CO_2(CH_2CH_2O)_2C_4H_9$,
2-butoxyethyl-propionate ($CH_3CH_2CO_2CH_2CH_2OC_4H_9$),
2isobutoxyethyl-propionate ($CH_3CH_2CO_2CH_2CH_2OCH_2CH(CH_3)_2$),
2-ethoxyethyl-n-butyrate ($C_4H_9CO_2CH_2CH_2OC_2H_5$),
2-ethoxyethyl-isobutyrate (($CH_3)_2CHCO_2CH_2CH_2OC_2H_5$),
2-ethoxyethyl-benzoate ($C_6H_5CO_2CH_2CH_2OC_2H_5$),
2-isopropoxyethyl-benzoate ($C_6H_5CO_2CH_2CH_2OCH(CH_3)_2$),
p-methoxybenzyl-acetate ($CH_3CO_2CH_2$—$C_6H_4OCH_3$),
4'-ethoxyphenyl-4-n-butylbenzoate ($CH_3(CH_2)_3C_6H_4CO_2C_6H_4OC_2H_4$),
tetrahydrofuryl-n-butyrate ($CH_3(CH_2)_2CO_2CH_2(C_4H_7O)$),
and so on. Among them, 2-ethoxyethyl-acetate and 2-methoxyethyl-acetate are preferred.

Component (C)

The component (C) is a titanium halide. Suitable titanium halides are trivalent and tetravalent titanium halides, particularly a tetravalent titanium halide. As the halogen, chlorine is preferred. Preferable titanium halides are compounds represented by the formula Ti- (OR')$_n$Cl$_{4-n}$ (R' being a C$_1$–C$_6$ hydrocarbon residue), wherein n=0 or 1. More specifically, titanium tetrachloride and titanium trichlorobutoxide may be mentioned.

Quantitative proportions

The compositional proportions of the three components (A)–(C) are not critical but can freely be selected, provided that the effect of the present invention can be recognized.

Generally speaking, the component (B) is employed in a molar ratio of the electron donating compound component (B) relative to the magnesium halide existing in the component (A) (Component (B)/Mg) of 0.02 to 1, preferably 0.05 to 0.6.

The component (C), which can be used in a wide range of proportions, is preferably so controlled that the content of the titanium atoms contained in the titanium-containing solid catalyst component prepared according to various methods, in general, will be within the range of from 0.5 to 15 wt. %, preferably 0.5 to 10 wt. %.

Preparation of titanium-containing solid catalyst component

The titanium-containing solid catalyst component of the present invention is formed by causing the constituent components (A), (B) and (C) thereof to contact one another in one batch or stepwise, or through one to plural times of contact, and can be obtained according to various preparation methods. Some typical examples of preparation methods are described below.

(I) MgX$_2$ (magnesium halide) and the component (B) are mixed and crushed, and the crushed product is brought into contact with the component (C) in liquid phase.

(II) The crushed product (component (A)) obtained by mixing and crushing MgX$_2$ and another electron donating compound other than the component (B) (e.g., ethyl α-phenylbutyrate) is brought into contact successively or at the same time with the component (B) and the component (C) in liquid phase.

(III) The components (A), (B) and (C) are mixed and crushed at the same time, and the resultant crushed product is subjected to extraction of soluble materials in a titanium halide or an inert solvent in liquid phase.

(IV) A hydrocarbon solution containing MgX$_2$ is prepared with the use of a dissolving agent such as alcohol, ether or alkoxide of titanium; the solution is brought into contact with a halogenating agent such as a halide of titanium or silicon to precipitate a solid (formation of the component (A)); and the precipitated solid is brought into contact successively or at the same time with the component (B) and the component (C) in liquid phase.

(V) In the method (IV), the component (B) is added to the resultant hydrocarbon solution containing MgX$_2$; the solution is brought into contact with a halogenating agent to precipitate a solid (contact treatment product of (A) and (B)); and the precipitated solid is brought into contact with the component (C) in liquid phase.

(VI) MgX$_2$ is dissolved in a hydrocarbon solvent with the use of butyl titanate then allowed to react with methylhydrogenpolysiloxane to precipitate a solid, which precipitated solid containing MgX$_2$ is brought into contact with a halide of silicon or (and) titanium (formation of the component (A)), and the contact treatment product is brought into contact successively or at the same time with the component (B) and the component (C).

It should be noted that a specific feature of the present invention resides in use of an electron donating compound having a specific molecular structure, and therefore its effect can be exhibited in the methods for preparation of various other kinds of titanium-containing solid catalyst component, if the electron donating compound of the present invention is employed therein. Accordingly, preparation of the titanium-containing solid catalyst component is not limited to the methods as exemplified above.

Polymerization of α-olefins:

The titanium-containing solid catalyst component of the present invention can be used in combination with an organic aluminum compound for polymerization of α-olefins.

The organic aluminum compound is a compound represented by the formula AlR$_n$X$_{3-n}$ (wherein R is a hydrocarbon residue having 1 to 12 carbon atoms; X is a halogen; and n is $0 < n \leq 3$).

Examples of such organic aluminum compounds are triethyl aluminum, tri-n-propyl aluminum, tri-n-butyl aluminum, tri-isobutyl aluminum, tri-n-hexyl aluminum, tri-isohexyl aluminum trioctyl aluminum, diethylaluminum hydride, diisobutylaluminum hydride, diethylaluminum monochloride, and ethyl aluminum sesquichloride. Of course, two or more of these aluminum compounds can be used in combination.

In carrying out polymerization reaction of an α-olefin having 3 or more carbon atoms for the purpose of improving the stereoregularity of the polymer formed, it is possible to add many compounds having the effect of stereoregularity which have been proposed in the Ziegler polymerization catalyst to the catalyst system comprising the titanium-containing solid catalyst component and an organic aluminum compound. Examples of compounds suitable for use for such a purpose are aromatic monocarboxylic acid esters, organic silicon compounds having

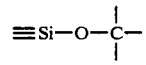

bonding, and heterocyclic compounds of nitrogen or oxygen having alkyl substituents. Specific examples are ethyl benzoate, ethyl p-anisate, phenyl trimethoxysilane, phenyl triethoxysilane, diphenyl dimethoxysilane, diphenyl diethoxysilane, tetraethylsilicate, 2,2,6,6-tetramethylpiperidine, and 2,2,6,6-tetramethylpyrane.

The ratio of the titanium containing solid catalyst component to the organic aluminum compound may be varied over a wide range, but the organic aluminum compound can be used generally at a ratio of 1 to 1000, preferably 10 to 500 (molar ratio), per titanium atom contained in the solid catalyst component.

The above-mentioned stereoregularity enhancer to be used for the purpose of enhancing the stereoregularity of an α-olefin polymer can accomplish that purpose even in a very small amount, when the titanium-containing solid catalyst component is used, but it is generally used in an amount of 0.001 to 1 mole, preferably 0.01 to 0.5 mole, per one mole of the organic aluminum compound.

The titanium-containing solid catalyst component, the organic aluminum compound and the stereoregularity enhancer may be brought into contact or mixed with each other in any desired order and times.

Among the olefins suitable for use for polymerization are ethylene, propylene, 1-butene, 1-hexene, 4-methylpentene-1 and the like. Not only homopolymerization of these olefins, but also random polymerization or block polymerization of two or more of these monomers can be conducted. Also, as for copolymerization, conjugated dienes or polyunsaturation compounds such as non-conjugated dienes can also be used as copolymerizable olefins.

Possible polymerization methods are, for example, the so called slurry polymerization method employing an inert hydrocarbon such as hexane, heptane, etc. as the solvent, the liquid phase polymerization method employing a liquefied monomer as the solvent, or the gas phase polymerization method in which the monomer exists as the gas phase.

The polymerization temperature is generally of the order of 20° to 150° C., preferably of the order of 40° to 100° C., and the polymerization pressure is of the order of from atmospheric to 100 atm., preferably of the order of from atmospheric to 50 atm. The control of the molecular weight of the polymer is practiced primarily according to the method in which hydrogen is used.

EXPERIMENTAL EXAMPLES

The present invention is further illustrated specifically by the following Examples, which are not intended to limit the scope of the invention.

EXAMPLE 1

(1) Preparation of titanium-containing solid cataylst components:

Into a 300 ml flask the air in which was thoroughly replaced with nitrogen, 50 ml of dehydrated and deoxygenized n-heptane was introduced, and then 0.1 mole of $MgCl_2$ (magnesium chloride) and 0.2 mole of $Ti(O-Bu)_4$ (titanium tetrabutoxide) were introduced. The reaction was then carried out at 90° C. for 2 hours to prepare a hydrocarbon solution of $MgCl_2$. As the next step, 12 ml of methylhydrogen-polysiloxane (20 cps) was added to the solution, and the reaction was carried out at 40° C. for 3 hours, whereupon about 40 g of a grayish white solid was precipitated. The precipitated solid was thoroughly washed with n-heptane and analyzed. It was found that 12.1 wt. % of $MgCl_2$ was contained in the precipitated solid.

A sample of 16 g ($MgCl_2$=1.94 g) from the precipitated solid was allowed to react with 7 ml of $SiCl_4$ (silicon tetrachloride) in 50 ml of n-heptane solvent at 70° C. for 2 hours. After completion of the reaction, the product was washed with n-heptane to produce a magnesium halide containing solid (component (A)).

To a slurry of the component (A) in n-heptane was added 0.56 ml of 2-ethoxyethyl-acetate ($CH_3CO_2CH_2CH_2OC_2H_5$/Mg=0.20 molar ratio), and reaction was carried out at 90° C. for 2 hours to obtain a contact treatment product of the component (A) and the component (B).

The contact treatment product was made into a slurry in n-heptane, to which 20 ml of $TiCl_4$ (titanium tetrachloride) was added. Thereafter treatment at 90° C. was carried out for 2 hours. After removal of the supernatant, contact treatment with $TiCl_4$ was conducted again under the same conditions (contact treatment with the component (C)). After this treatment, the solid was washed by decantation ($\times 6$ with 100 ml of n-heptane) to obtain the desired titanium-containing solid catalyst component slurry. A part of this slurry was sampled and analyzed after evaporating n-heptane to dryness, whereupon it was found that the solid contained 2.35 wt. % of titanium.

(2) Polymerization of propylene:

(a) Polymerization 1

Into an autoclave of 1-liter inner capacity equipped with a stirring device were charged 500 ml of dried and degassed n-heptane, 107 mg of diphenyldimethoxysilane, 250 mg of triethyl aluminum (Si/Al=0.2 molar ratio), and the above solid catalyst component in an amount of 0.5 mg as calculated in terms of the Ti atom under a propylene atmosphere in the order mentioned, and polymerization was initiated with the addition of 100 ml hydrogen. Polymerization was carried out under the conditions of a propylene pressure of 7 $kg/cm^2G$, 70° C., and 3 hours. After completion of polymerization, the residual monomer was purged; the polymer slurry was filtered; and the amounts of the respective polymers formed were determined by drying of the powdery polymer and concentration of the filtrate.

The stereoregularity of the powdery polymer (hereinafter called "product I.I.") was determined according to the boiling n-heptane extraction test. The total I.I. (ratio of the amount of the polymer insoluble in boiling n-heptane relative to the total amount of polymers formed) was determined according to the correlational formula: the total I.I.=powdery polymer amount×product I.I./(powdery polymer amount+filtrate concentrated polymer amount). The results are shown in Table 1.

(b) Polymerization 2:

Polymerization 2 was carried out under the conditions described in polymerization 1 except for changing the propylene polymerization conditions to 7 $kg/cm^2G$, 70° C. and 5 hours.

The results are shown in Table 1.

(c) Polymerization 3:

Polymerization 3 was practiced under the conditions set forth in Polymerization 1 except for changing the propylene polymerization conditions to 7 $kg/cm^2G$, 80° C. and 3 hours.

The results are shown in Table 1.

TABLE 1

| | Polymerization results in Example 1 | | |
|---|---|---|---|
| Polymerization results | Polymerization 1 | Polymerization 2 | Polymerization 3 |
| Activity | | | |
| (gPP/g Ti) | 27.3 × 10$^4$ | 39.0 × 10$^4$ | 27.0 × 10$^4$ |
| (gPP/g solid catalyst) | 6400 | 9200 | 6300 |
| Atactic formation percentage (%)* | 0.73 | 0.72 | 0.81 |
| Product I.I. (%) | 98.1 | 98.3 | 99.1 |
| Total I.I. (%) | 97.4 | 97.6 | 98.3 |
| MI (g/10min.) | 1.0 | 1.0 | 1.3 |

*Atactic formation percentage = $\frac{\text{(Filtrate concentrated polymer)}}{\text{(Total polymer formed)}} \times 100$

EXAMPLES 2 TO 6

In the preparation of titanium-containing solid catalyst components, solid catalyst components were prepared under the conditions set forth in Example 1 except for varying the electron donating compounds employed and their amounts for contact treatment. Polymerization of propylene was carried out under the conditions for Polymerization 1.

The results are shown in Table 2.

Comparative Examples 1 to 4

Preparation of solid titanium catalyst components was carried out under the same conditions described in Example 1 except for the use of known electron donating compounds which are not defined in the component (B) of the present invention or the electron donating compounds having molecular structures which are relatively similar to the component (B) of the present invention. Polymerization of propylene was carried out under the conditions for Polymerization 1.

The results are shown in Table 3.

as defined in Japanese Laid-Open Patent Publication No. 63310/1982. While this compound exhibits only performance of a low level (low I.I.), the compound of Example 5 of the present invention similar partly in structure (cellosolve isobutyrate) exhibits markedly high I.I. This is entirely the same between Comparative Example 2 (ethyl benzoate) and Example 6 (cellosolve benzoate).

Thus, the difference by 10 and some % in I.I. due to the difference in the electron donating compounds is an indication that the respective solid catalyst components obtained from both are entirely different in nature.

(2) Thus, although the specificity of the electron

TABLE 2

| | Preparation of solid catalyst component | | | Results of propylene polymerization | | | | | |
|---|---|---|---|---|---|---|---|---|---|
| Example | Component (B) | Component (B)/Mg (molar ratio) | Ti carried (wt. %) | Yield per titanium (gPP/gTi) | Yield per solid catalyst (gPP/g solid catalyst) | Atactic formation (%) | Product I.I. (%) | Total I.I. (%) | MI (g/10 min.) |
| 2 | $CH_3C-O-CH_2CH_2-O-C_2H_5$<br>$\parallel$<br>$O$<br>Cellosolve acetate | 0.15 | 2.81 | $25.3 \times 10^4$ | 7100 | 1.26 | 97.8 | 96.6 | 0.9 |
| 3 | $CH_3C-O-CH_2CH_2-O-CH_3$<br>$\parallel$<br>$O$<br>Methylcellosolve acetate | 0.20 | 2.90 | 15.5 | 4500 | 0.91 | 98.4 | 97.5 | 4.1 |
| 4 | $CH_3C-O-CH_2CH_2-O-C_4H_9$<br>$\parallel$<br>$O$<br>n-Butylcellosolve acetate | 0.20 | 2.59 | 20.3 | 5300 | 1.67 | 97.0 | 95.4 | 1.1 |
| 5 | $(CH_3)_2CH-C-O-CH_2CH_2-O-C_2H_5$<br>$\parallel$<br>$O$<br>Cellosolve isobutyrate | 0.20 | 2.25 | 24.2 | 5500 | 1.57 | 96.8 | 95.3 | 4.3 |
| 6 | $C_6H_5C-O-CH_2CH_2-O-C_2H_5$<br>$\parallel$<br>$O$<br>Cellosolve benzoate | 0.20 | 2.34 | 24.5 | 5700 | 1.06 | 97.5 | 96.5 | 1.4 |

TABLE 3

| | Preparation of solid catalyst component | | | Results of propylene polymerization | | | | | |
|---|---|---|---|---|---|---|---|---|---|
| Comparative Example | Electron donating compound | (B')/Mg (molar ratio) | Ti carried (wt. %) | Yield per titanium (gPP/gTi) | Yield per solid catalyst (gPP/g solid catalyst) | Atactic formation (%) | Product I.I. (%) | Total I.I. (%) | MI (g/10 min.) |
| 1 | $(CH_3)_2CH-C-O-C_2H_5$<br>$\parallel$<br>$O$<br>Ethyl isobutyrate | 0.20 | 2.76 | $27.8 \times 10^4$ | 7700 | 7.56 | 90.5 | 83.7 | 5.5 |
| 2 | $C_6H_5-C-O-C_2H_5$<br>$\parallel$<br>$O$<br>Ethyl benzoate | 0.20 | 2.34 | 24.7 | 5800 | 6.09 | 90.9 | 85.4 | 2.6 |
| 3 | $o\text{-}CH_3OC_6H_4C-O-CH_3$<br>$\parallel$<br>$O$<br>o-Methoxymethyl benzoate | 0.20 | 4.77 | 15.6 | 7400 | 10.9 | 93.5 | 83.5 | 4.2 |
| 4 | $(CH_3OCH_2CH_2)_2O$<br>Diethyleneglycol methylether | 0.20 | 6.20 | 0.4 | 240 | — | — | — | — |

From the results in Table 2 and Table 3, the following conclusions can be clearly reached.

(1) The electron donating compound employed in Comparative Example 1 (ethyl isobutyrate) is a compound belonging to the carboxylic acid monoesters having "branched alkyl with 3 or more carbon atoms" donating compound of the present invention is based on the specific feature of having also the C—O—C bonding, no excellent effect can be exhibited unless the structure site where such C—O—C bonding exists is specified as in the present invention, as apparently seen from comparison between Example 6:

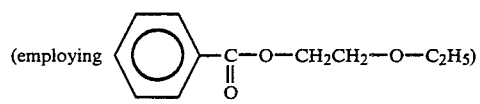

and Comparative Example 3:

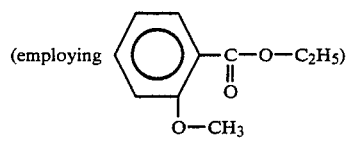

(3) If this C—O—C bonding exists at the structural site as specified by the present invention, the electron donating compound becomes astonishingly different in nature. In contrast, a compound having only an ether bonding can produce only a solid catalyst component with an entirely low level of activity.

EXAMPLE 7

Under a nitrogen atmosphere, 20 g of anhydrous $MgCl_2$ was charged into a vibrating mill pot with an inner volume of one liter (the pot containing about 800 cc (apparent volume) of stainless steel balls of 25-mm diameter), and 5.0 ml of $Ti(OBu)_4$, ($Ti(OBu)_4/MgCl_2=0.07$ (molar ratio)) was added in the two divided equal portions with mixing and crushing for 6 hours and 16 hours, respectively. Then, 7.4 ml of ethyl α-phenylbutyrate ($CH_3CH_2CH(C_6H_5)CO_2C_2H_5$) (ethyl α-phenylbutyrate/$MgCl_2=0.18$ (molar ratio)) was similarly added in the two divided equal portions with mixing and crushing for 6 hours and 16 hours, respectively, to obtain a $MgCl_2$ containing a solid (component (A)).

Of the crushed solid obtained, 6 g was apportioned into a flask of 200 ml, dispersed with introduction of 20 ml of $TiCl_4$, then 0.62 ml of a solution of cellosolve acetate ($CH_3CO_2C_2H_4OC_2H_5$) (cellosolve acetate/$MgCl_2=0.2$ (molar ratio)) in n-heptane (20 ml) was added dropwise from a funnel, and the contact treatment was carried out at 90° C. for 2 hours. After thus carrying out the simultaneous contact treatment of the component (A), the component (B) and the component (C), the supernatant was removed, after which the treatment with addition of 20 ml of $TiCl_4$ and 30 ml of n-heptane was again carried out at 90° C. for 2 hours. Then the solid was washed by decantation ($\times 6$ with 100 ml of n-heptane) to obtain a slurry of the desired titanium-containing solid catalyst component (the solid catalyst component containing 2.61 wt. % of titanium).

With the use of this solid catalyst component slurry, polymerization of propylene was conducted under the conditions of Polymerization 1. The results are shown in Table 4.

Comparative Example 5

The procedure and the conditions in Example 7 were employed except for using no cellosolve acetate (the component (B)) whatsoever to prepare a solid catalyst component slurry. That is, only ethyl α-phenylbutyrate ($CH_3CH_2CH(C_6H_5)CO_2C_2H_5$)) was employed as the electron donating compound (this compound also belonging to the monocarboxylic acid esters as defined in Japanese Laid-Open Patent Publication No. 63310/1982) (the catalyst component containing 3.28 wt. % of titanium).

With the use of this catalyst slurry, polymerization of propylene was conducted under the conditions of Polymerization 1 to obtain the results shown in Table 4.

TABLE 4

| Polymerization results | Example 7 | Comparative Example 5 |
|---|---|---|
| Activity | | |
| (gPP/gTi) | 27.0 | 28.6 × 10⁴ |
| (gPP/g solid catalyst) | 7100 | 9400 |
| Atactic formation percentage (%) | 2.29 | 6.57 |
| Product I.I. (%) | 97.8 | 92.9 |
| Total I.I. (%) | 95.6 | 86.8 |
| MI (g/10 min.) | 1.0 | 2.1 |

EXAMPLE 8

In preparation of a titanium containing solid catalyst component, 0.31 mole of the component (B) used in Example 1 2-ethoxyethylacetate ($CH_3CO_2CH_2CH_2OC_2H_5/Mg=0.11$ molar ratio) and the number of contact treatment with the component (C) was changed to three times, otherwise following entirely the same procedure under the same conditions as in Example 1, to prepare a solid catalyst component.

Polymerization of propylene was conducted under the conditions of Polymerization 1.

These results are shown in Table 5.

EXAMPLE 9

In the preparation of a titanium-containing solid catalyst component, the magnesium halide-containing solid (component (A)) obtained according to the same procedure and under the same conditions as in Example 1, prior to contact with the component (B), was subjected first to the contact treatment with 20 ml of $TiCl_4$ of the component (C) at 90° C. for 2 hours, which was followed by addition of 0.35 ml of 2-ethoxyethylacetate ($CH_3CO_2CH_2CH_2OC_2H_5/Mg=0.125$ molar ratio) to carry out contact treatment at 90° C. for one hour. Thereafter, according to the procedure of Example 1 under the same conditions, a solid catalyst component was prepared.

Polymerization of propylene was conducted under the conditions of Polymerization 1 to obtain the results shown in Table 5.

EXAMPLE 10

With the use of 20 g of the precipitated solid ($MgCl_2=2.42$ g), 0.38 ml of 2-ethoxyethylacetate ($CH_3CO_2CH_2CH_2OC_2H_5/Mg=0.11$ molar ratio) was added into the slurry of the precipitated solid in 100 ml of n-heptane, and, further, 3.0 ml of $TiCl_4$ was added thereto to carry out the simultaneous contact treatment with the component (B) and the component (C) at 25° C. for one hour.

The contact treatment product was washed with n-heptane then treated with 10 ml of $TiCl_4$ and, after removal of the supernatant, again subjected to the contact treatment with 20 ml of $TiCl_4$ at 90° C. for 2 hours, which procedure was repeated twice. After this treatment, the solid was washed by decantation to obtain the desired titanium-containing solid catalyst component slurry.

Polymerization of propylene was conducted under the conditions of Polymerization 1, whereupon the results shown in Table 5 were obtained.

EXAMPLE 11

With the use of 20 g of the precipitated solid ($MgCl_2$=2.42 g), 0.38 ml of 2-ethoxyethylacetate ($CH_3CO_2CH_2CH_2OC_2H_5$/Mg=0.11 molar ratio) was added into the slurry of the precipitated solid in 50 ml of n-heptane, and, further, 5 ml (10 mM) of a 2 M/liter solution of $Ti(OBu)_2Cl_2$ (dichlorodibutoxy titanate) was added thereto to carry out the contact treatment at 25° C. for 30 minutes. Then, the contact treatment was further continued for 30 minutes by adding additionally 1 ml of $TiCl_4$.

The contact treatment product was washed with n-heptane then treated with 1.7 ml of $TiCl_4$ and 25 ml of n-heptane and, after removal of the supernatant, again subjected to the contact treatment with 20 ml of $TiCl_4$ at 80° C. for 2 hours, which procedure was repeated twice. After this treatment, the solid was washed by decantation to obtain the desired titanium-containing solid catalyst component slurry.

Polymerization of propylene was conducted under the conditions of Polymerization 1, whereupon the results shown in Table 5 were obtained.

EXAMPLE 12

In the preparation of the contact treatment of the component (A) with the component (B) according to the crushing method, following under the same conditions as in Example 7 except for changing the molar ratio of $Ti(OBu)_4/MgCl_2$ to 0.05 and employing cellosolve acetate ($CH_3CO_2C_2H_4OC_2H_5$) in a ratio of cellosolve acetate/$MgCl_2$ (molar ratio) in place of ethyl α-phenylacetate, the crushing contact treatment solid of the component (A) and the component (B) was obtained.

The resultant crushed solid (6 g) obtained was apportioned into a 200-ml flask, and 20 ml of $TiCl_4$ was added thereto to carry out contact treatment with the component (C) at 90° C. for 2 hours. This procedure was repeated twice.

After this treatment, the solid was washed by decantation to obtain the desired titanium-containing solid catalyst component slurry.

Polymerization of propylene was carried out under the conditions of Polymerization 1, whereupon the results shown in Table 5 were obtained.

(A) a magnesium halide-containing solid;
(B) an electron donating compound, wherein the electron donating compound is represented by the following formula:

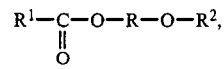

wherein R represents a hydrocarbon residue having 1 to 12 carbon atoms; and each of $R^1$ and $R^2$ represents an alkyl, an aryl, an alkyl-substituted aryl or an aryl-substituted alkyl; and
(C) a titanium halide.

2. The catalyst component of claim 1, wherein R represents an alkylene group having 1 to 12 carbon atoms; $R^1$ represents an alkyl group having 1 to 12 carbon atoms or a phenyl group; and $R^2$ represents an alkyl group having 1 to 12 carbon atoms, a phenyl group or a tolyl group.

3. A method of producing a titanium-containing solid catalyst component for polymerization of α-olefins, which comprises causing the components (A), (B) and (C) defined below to contact one another:
(A) a magnesium halide containing solid;
(B) an electron donating compound, wherein the electron donating compound is represented by the formula:

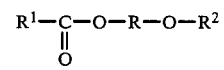

wherein R represents a hydrocarbon residue having 1 to 12 carbon atoms; and each of $R^1$ and $R^2$ represents an alkyl, an aryl, an alkyl-substituted aryl or an aryl-substituted alkyl; and
(C) a titanium halide.

4. A method according to claim 3, wherein the molar ratio of the compound (B) of the electron donating compound relative to the magnesium halide existing in the component (A) (Compound (B)/Mg) is in the range of from 0.02 to 1.

5. A method according to claim 3, wherein the magnesium halide is magnesium chloride, and the titanium halide is titanium tetrachloride.

6. The method of claim 3, wherein R represents an alkylene group having 1 to 12 carbon atoms; $R^1$ represents an alkyl group having 1 to 12 carbon atoms or a

TABLE 5

| | Preparation of solid catalyst component | | Results of propylene polymerization | | | | | |
|---|---|---|---|---|---|---|---|---|
| Example | Component (B)/Mg (molar ratio) | Ti carried (wt. %) | Yield per titanium (gPP/gTi) | Yield per solid catalyst (gPP/g solid catalyst) | Atactic formation (%) | Product I.I. (%) | Total I.I. (%) | MI (g/10 min.) |
| 8 | 0.11 | 3.08 | 37.7 × 10⁴ | 11600 | 0.64 | 98.1 | 97.5 | 1.1 |
| 9 | 0.125 | 3.29 | 35.9 | 11800 | 0.50 | 98.9 | 98.4 | 1.2 |
| 10 | 0.11 | 3.52 | 28.7 | 10100 | 0.56 | 98.1 | 97.6 | 2.7 |
| 11 | 0.11 | 3.19 | 32.6 | 10400 | 0.31 | 97.8 | 97.5 | 4.0 |
| 12 | 0.12 | 2.24 | 36.2 | 8100 | 1.30 | 97.8 | 96.5 | 11.7 |

What is claimed is:

1. A titanium-containing solid catalyst component for polymerization of α-olefins, which is obtained by causing the components (A), (B) and (C) defined below to contact one another:

phenyl group; and $R^2$ represents an alkyl group having 1 to 12 carbon atoms, a phenyl group or a tolyl group.

7. A method according to claim 3, wherein the electron donating compound is 2-ethoxyethyl-acetate and/or 2-methoxyethyl-acetate.

* * * * *